J. NUTTALL.
ROTARY STEAM JOINT.
APPLICATION FILED OCT. 23, 1909.
951,771.
Patented Mar. 8, 1910.
2 SHEETS—SHEET 1.
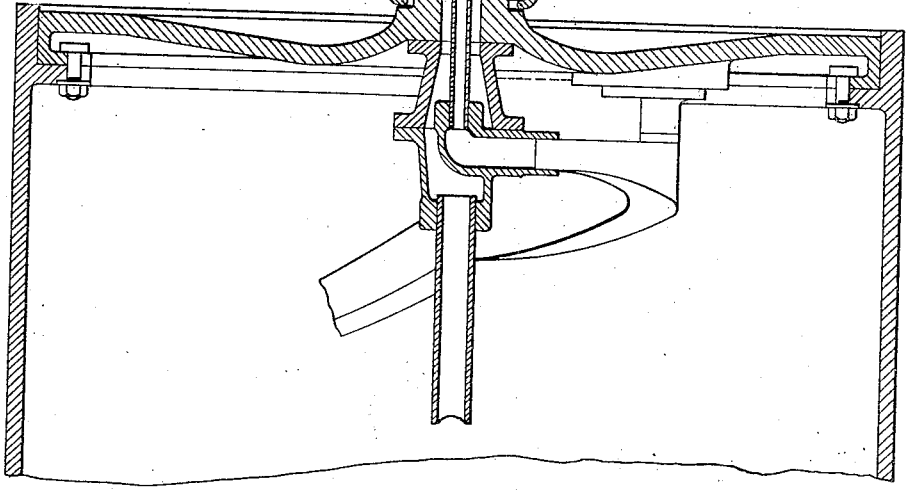

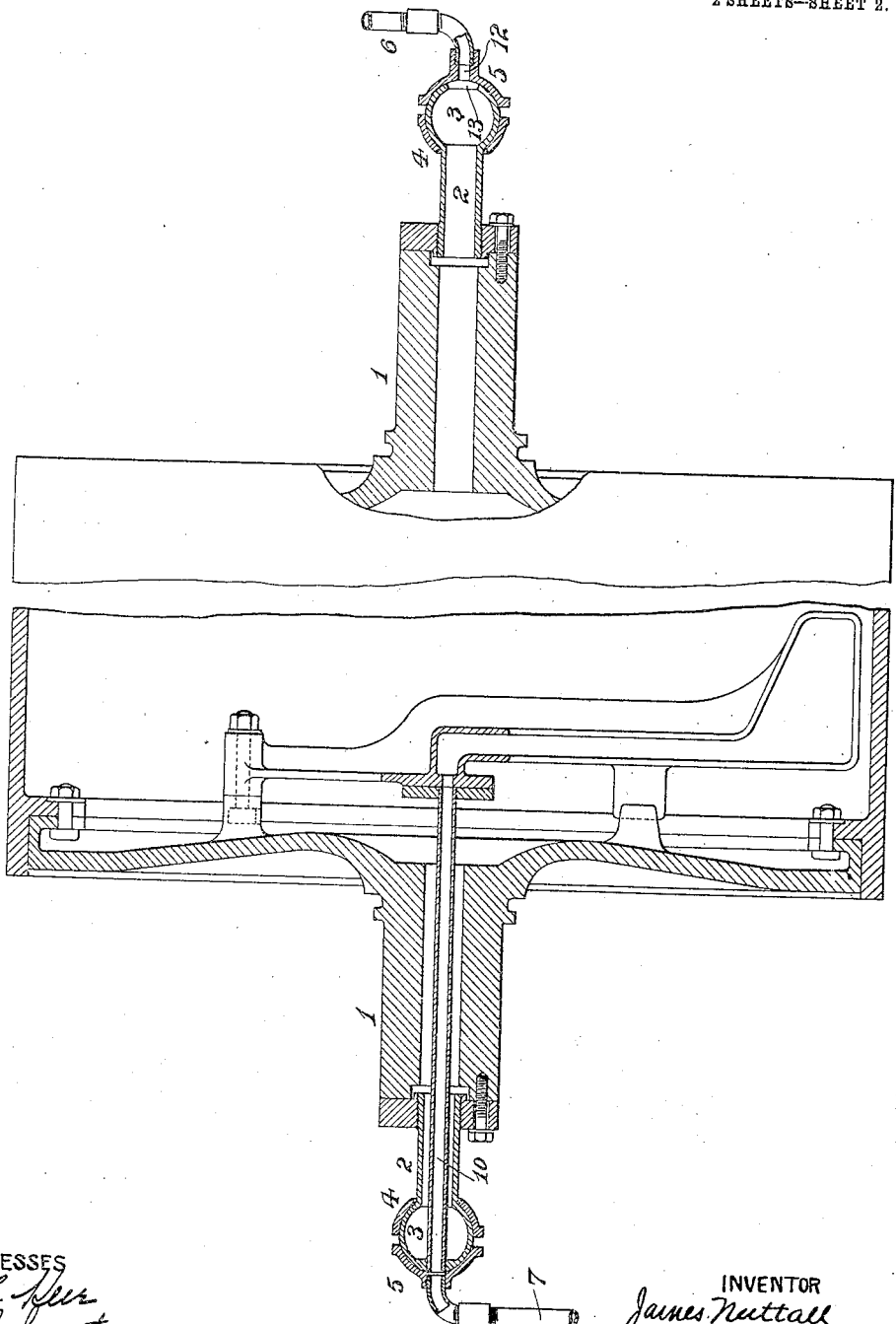

UNITED STATES PATENT OFFICE.

JAMES NUTTALL, OF BURY, ENGLAND.

ROTARY STEAM-JOINT.

951,771. Specification of Letters Patent. Patented Mar. 8, 1910.

Application filed October 23, 1909. Serial No. 524,281.

*To all whom it may concern:*

Be it known that I, JAMES NUTTALL, a subject of the King of Great Britain and Ireland, of Park View, Walmersley Road, Bury, in the county of Lancaster, England, have invented new and useful Improved Rotary Steam-Joints, of which the following is a specification.

The object of my invention is to provide improved means for use in passing steam, or other fluids, into and from rotating cylinders and the like, my invention relating to the class of apparatus wherein a hollow stem, affixed to the end or trunnion of the cylinder, or the like, has a hollow head perforated for the inlet and outlet of steam, or other fluid, and is capable of rotating in fixed bearing parts carrying, or being connected with the inlet pipe and the outlet pipe.

I make the device as hereinafter described so that it has no packing glands or internal joints, so that inlet steam or fluid, cannot escape into the outlet chamber and pipe and so that if any leakage should occur, the steam or fluid will escape outside the device and the leakage will at once be detected and can be remedied with great ease even during the running of the apparatus. I may apply my improved arrangement so that the inlet and outlet are both at the same end of the cylinder, or the like, or I may apply it at each end of the cylinder, or the like, making the inlet for steam, or other fluid, through one of the bearing parts and the hollow head at one end and the outlet through one of the bearing parts and the hollow head at the other end.

According to my invention I make the hollow head of such shape that it can be held and rotate between two fixed and separate external bearing parts which can be drawn toward each other so as to give a tight bearing against the said hollow head, one of the said bearing parts carrying, or being connected with, the inlet pipe and the other part carrying, or being connected with, the outlet pipe, as hereinafter fully explained. I connect the members of each of the pairs of fixed bearing parts so that they can be brought toward each other to give a tight bearing against the hollow head, preferably by means of bolts carrying springs for pressing the bearing parts into contact with the hollow head.

I will describe constructions in accordance with my invention with reference to the accompanying drawings and for the purposes of description I will presume that the fluid is steam and that it is to be passed into, and the water of condensation discharged from a cylinder.

Figure 1 is a section of one end of a cylinder with a device in accordance with my invention applied; Fig. 2 is a plan of the device; Fig. 3 is a transverse section on the line A, B, Fig. 1; and Fig. 4 represents, in section, the two ends of a cylinder, provided with a modification in accordance with my invention.

Referring first to Figs. 1, 2 and 3, I affix to the cylinder-end, or trunnion, 1, a hollow stem 2, terminating in a hollow head 3, which can rotate between two fixed bearing parts 4 and 5 to one of which (that marked 4) the steam-inlet pipe 6 is fixed and to the other of which (that marked 5) the outlet pipe 7, is fixed, the two bearing parts 4 and 5 embracing and fitting against opposite portions of the said head 3. I have shown the said head 3 as being of spherical form and the bearings 4 and 5 as being concave to fit against opposite portions thereof although the head 3 and bearing parts 4 and 5 may be of other shape as hereinafter explained. The said bearing parts 4 and 5 may be connected together for instance as shown in Fig. 2 by long bolts 8, passing through lugs on the said parts and with springs 9, arranged so as to give a somewhat flexible connection and a good bearing by pressing at one end on the lugs on the part 4 and at the other end on nuts on the bolts 8. A pipe 10 leads from the interior of the cylinder and passes through the cylinder end, or trunnion, 1, and the spherical head 3, so as to communicate with the pipe 7, fixed to the outer of the aforesaid bearing parts 5, the inner one (4) of which is formed with a chamber 11 perforated at 12, so as to be put in communication with the spherical head 3, by perforations 13, therein. The pipe 6 communicates with this chamber 11. If the pipe 10, leading from the cylinder may rotate with the cylinder the outer end of the said pipe can be fixed to the spherical head, as shown, but if the said pipe 10, be a siphon pipe, or, for other reason, is not to rotate with the cylinder the outer end of the said pipe is connected to the fixed outer bearing part 5 against which the spherical head 3 bears. The steam can be admitted by the pipe 6, to the chamber 11, in the inner bearing part 4, and pass through the perforations 12 and 13, into the spherical head 3, and through the stem 2 into the cylinder and water of condensation pass out by the pipe, 7, the said water passing from the cylinder by the pipe 10, which passes through the stem 2, and spherical head 3, or, if desired, the passage of the steam and water of condensation may be in the reverse directions, and the outlet of the lifting arrangement inside the cylinder be reversed.

The aforesaid bearing parts 4 and 5 in which the spherical head 3, rotates can be fixed to any convenient stationary part and will give a sufficiently tight bearing on the said head, 3, the inner bearing part 4 extending over the said head 3, sufficiently to cover the perforations in the said head 3, so that steam does not pass therethrough except when the perforations 13, are in communication with the perforation 12, in the aforesaid chamber 11. In the drawings I have shown the said bearing parts 4 and 5 as being supported by steam and exhaust pipes connected with main steam supply and exhaust pipes, and although the said bearing parts are shown as being connected by bolts and nuts with the intervention of springs, these springs are not essential. By making a slot instead of the perforations 12, steam, or the like, will constantly pass into the hollow head if the perforations 13 be arranged close to each other.

Fig. 4 shows a construction wherein instead of the bearing parts being perforated so that the steam or other fluid enters the hollow head by one of them, and leaves by the other of them at the same end of the cylinder hereinbefore described, I provide a hollow stem and hollow head at each end of the cylinder, or the like, and I carry each hollow head between two bearing parts one of which is not perforated for the passage of steam, or other fluid, the other bearing piece at one end of the cylinder, or the like, being connected with the inlet pipe for steam or other fluid, and the other bearing piece at the opposite end of the cylinder, or the like, being connected with the fluid exit pipe.

To the cylinder end, or trunnion 1, at each end of the cylinder, I affix a hollow stem, 2, terminating in a hollow head 3, which can rotate between two bearing parts 4 and 5. To the part 5, at one end of the cylinder the inlet pipe 6, for steam, or other fluid, is connected so that the steam, or other fluid, will pass through the openings 12 and 13, in the said part 5, and the hollow head respectively, and thence by the hollow stem, 2, and hollow trunnion, into the cylinder. To the part 5, at the other end of the cylinder is attached the outlet pipe 7 for water of condensation, which water passes from the cylinder through the pipe 10, led through the hollow trunnion 1 and stem 2 and head 3 and secured in the head 3, so that the pipe 10, communicates with the pipe 7. The parts 4 and 5 may be connected together, or held in position in any suitable way, preferably by means of lugs, long bolts, and springs as hereinbefore described.

Instead of the head 3, on the stem 2, being spherical it can be made of any other suitable shape, such, for example, as cylindrical with curved, or straight conical ends, or concave ends, and the bearing parts 4 and 5 may be made of corresponding shape to fit these ends, or one bearing part may be made concave to fit against a coned, or convex part of the head 3, and the other bearing part be made convex to fit against an internal cone, or concave part of the head 3, or the bearing parts 4 and 5, and the parts of the head against which they bear may be made flat. These variations in shape will be readily understood without special illustration as the operation will be practically the same as in the arrangements illustrated.

I claim as my invention:

1. The combination with rotatable cylinders or the like, of a hollow stem affixed to the cylinder end, or trunnion, and having a hollow head perforated for the inlet and the outlet of steam, or other fluid together with two separate and external fixed bearing parts therefor, one carrying or being connected with the inlet pipe and the other carrying, or being connected with the outlet pipe, and the said two bearing parts being provided with means by which they can be brought toward each other to give a tight bearing against the hollow head, substantially as hereinbefore described.

2. The combination with rotatable cylinders, or the like, of a hollow stem affixed to the cylinder end, or trunnion, and having a hollow head perforated for the inlet and outlet of steam, or other fluid, together with two separate and external fixed bearing parts therefor connected with the inlet and outlet respectively, the said bearing parts being connected together by bolts carrying springs for pressing the bearing parts into contact with the hollow head, substantially as hereinbefore described.

3. The combination with the respective ends, or trunnions, of rotatable cylinders or the like, of a hollow stem having a hollow head, together with separate and external fixed bearing parts therefor provided with means for adjusting said parts toward each other to give a tight bearing against the hollow head, one of such bearing parts at one end of the cylinder, or the like, being connected with the inlet, and one of the bearing parts at the other end of the cylinder, or the like, being connected with the outlet, substantially as hereinbefore described.

In testimony whereof I have signed my name to this specification in the presence of two subscribing witnesses.

JAMES NUTTALL.

Witnesses:
  WILLIAM HENRY,
  ALFRED NUTTALL.